United States Patent
Pressman et al.

(10) Patent No.: US 12,103,422 B2
(45) Date of Patent: Oct. 1, 2024

(54) CHARGE TRANSFER TIMING SYSTEM AND METHOD

(71) Applicant: Transportation IP Holdings, LLC, Norwalk, CT (US)

(72) Inventors: Jacob Pressman, Erie, PA (US); Neil Burkell, Erie, PA (US); Ajith Kuttannair Kumar, Erie, PA (US); Bret Worden, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 18/315,957

(22) Filed: May 11, 2023

(65) Prior Publication Data

US 2023/0382258 A1 Nov. 30, 2023

Related U.S. Application Data

(60) Provisional application No. 63/346,225, filed on May 26, 2022.

(51) Int. Cl.
| | |
|---|---|
| *B60L 53/62* | (2019.01) |
| *B61C 9/48* | (2006.01) |
| *B61C 17/06* | (2006.01) |
| *B61L 27/57* | (2022.01) |
| *H02J 7/00* | (2006.01) |

(52) U.S. Cl.
CPC ............. *B60L 53/62* (2019.02); *B61C 17/06* (2013.01); *H02J 7/0047* (2013.01); *H02J 7/00712* (2020.01); *B60L 2200/26* (2013.01); *B60L 2240/545* (2013.01); *B60L 2240/547* (2013.01); *B61C 9/48* (2013.01); *B61L 27/57* (2022.01)

(58) Field of Classification Search
CPC ................. B60L 53/62; B60L 2200/26; B60L 2240/545; B60L 2240/547; B60L 58/18; B60L 58/12; B61C 17/06; B61C 9/48; H02J 7/0047; H02J 7/00712; B61L 27/57
See application file for complete search history.

(56) References Cited

U.S. PATENT DOCUMENTS

| | | | | |
|---|---|---|---|---|
| 2011/0078092 | A1* | 3/2011 | Kim | B60L 53/305 320/109 |
| 2013/0179061 | A1* | 7/2013 | Gadh | B60L 53/305 701/1 |
| 2014/0009117 | A1* | 1/2014 | Ishii | H02J 3/32 320/126 |

(Continued)

OTHER PUBLICATIONS

Extended European Search Report for related EP App No. 23174246 dated Oct. 26, 2023 (7 pages).

*Primary Examiner* — Phutthiwat Wongwian
*Assistant Examiner* — Susan E Scharpf
(74) *Attorney, Agent, or Firm* — K&L Gates LLP (57) ABSTRACT

A charge transfer timing system and method include determining a charge capability of one or more power sources configured to supply charging power to multiple battery packs of a powered system. The system and method include calculating a time required to charge the battery packs to at least one of a target voltage or a target energy level. The time that is calculated may be based at least in part on a current state of charge (SOC) of the battery packs, a pack configuration of the battery packs, and the charge capability.

20 Claims, 5 Drawing Sheets

(56) References Cited

U.S. PATENT DOCUMENTS

| | | | |
|---|---|---|---|
| 2014/0139189 A1* | 5/2014 | Izumi | H02J 7/0048 320/134 |
| 2015/0180255 A1* | 6/2015 | Kim | B60L 50/51 320/162 |
| 2015/0258909 A1* | 9/2015 | Kim | B60H 1/00392 320/155 |
| 2015/0329003 A1* | 11/2015 | Li | B60L 50/16 320/134 |
| 2016/0190833 A1* | 6/2016 | Roumi | H02J 7/00 320/136 |
| 2019/0207398 A1* | 7/2019 | Shih | B60L 53/53 |
| 2020/0164763 A1* | 5/2020 | Holme | B60L 58/21 |
| 2020/0254897 A1* | 8/2020 | Loghavi | B60L 53/67 |
| 2021/0146796 A1* | 5/2021 | Enslin | H02J 7/1446 |
| 2022/0089054 A1* | 3/2022 | Harshe | H02J 7/0047 |

* cited by examiner

CHARGE TRANSFER TIMING SYSTEM AND METHOD

CROSS-REFERENCE TO RELATED APPLICATIONS

This application is a non-provisional conversion of, and claims priority to, U.S. Provisional Patent Application No. 63/346,225, which was filed on May 26, 2022, and the entire disclosure of which is incorporated herein by reference.

BACKGROUND

Technical Field

The subject matter described herein relates to transferring electrical power to and from batteries of a powered system, such as batteries onboard a vehicle that power the vehicle.

Discussion of Art

Some powered systems are electrically powered via batteries and receive power from off-board power sources. Such powered systems include electric vehicles which use batteries to power motors for generating tractive effort. Battery-powered systems discharge power from the batteries during operation of the systems, and the batteries have to be periodically recharged for future operations. Although regenerative braking and other techniques can be implemented to harness some energy for recharging the batteries, the powered systems in industrial and/or transportation settings typically have to be charged for an extended time period from an off-board power source to reach a target voltage or energy level. The powered systems may be unavailable for productive use while charging from the off-board power source. It may be difficult to predict when a given powered system that is charging will be available for active service again because charge times are affected by various different factors, such as the battery architecture and configuration in the powered system, the current state of charge of the batteries, and the charge capability of the off-board power source and hardware circuitry along the electrical charging path. Because of the need to charge and the difficulty of determining when the charging of a powered system will be completed, it may be difficult to accurately and reliably plan trip schedules of the powered system, crew schedules, and the like to enable efficient asset usage.

It may be desirable to have a system and method that differs from those that are currently available.

BRIEF DESCRIPTION

In one or more embodiments, a charge transfer timing method is provided that includes determining a charge capability of one or more power sources configured to supply charging power to multiple battery packs of a powered system. The method includes calculating a time required to charge the battery packs to at least one of a target voltage or a target energy level. The time that is calculated is based at least in part on a current state of charge (SOC) of the battery packs, a pack configuration of the battery packs, and the charge capability.

In one or more embodiments, a charge transfer timing system is provided that includes a controller that has one or more processors. The controller is configured to determine a charge capability of one or more power sources configured to supply charging power to multiple battery packs of a powered system. The controller is configured to calculate a time required to charge the battery packs to at least one of a target voltage or a target energy level, based at least in part on a current state of charge (SOC) of the battery packs, a pack configuration of the battery packs, and the charge capability.

BRIEF DESCRIPTION OF THE DRAWINGS

The inventive subject matter may be understood from reading the following description of non-limiting embodiments, with reference to the attached drawings, wherein.

DETAILED DESCRIPTION

Embodiments of the subject matter described herein relate to a charge transfer timing system that is designed to determine the time to charge or discharge batteries of a powered system. The powered system may have multiple battery packs, where each battery pack includes one or more battery cells. The system may calculate the time required to charge the battery packs to a target voltage and/or a target energy level based on various factors. The factors may be specific to the powered system and to one or more power sources that supply the charging power to the powered system for charging the battery packs. The system and method disclosed herein may additionally or alternatively determine the time required to discharge (e.g., deplete) the battery packs of the powered system to a target voltage or target energy level. Some of the factors used in the discharge calculation may be similar or the same as factors used in the charge calculation. By providing an estimate on time until the battery packs are fully charged (e.g., to the target voltage or energy level), the charge transfer timing system enables clients to plan trips of the powered systems, plan crew schedules, and the like, to enhance fleet usage. Similarly, by providing a time until the battery packs are depleted (e.g., the target voltage or energy level), the clients can plan charging events and infrastructure (e.g., charging station) placement along routes.

The time that is calculated may refer to a specific time of day in which the battery packs are predicted to achieve the target voltage and/or energy level, and/or may refer to an amount of time remaining, such as in the form of a timer, until the target voltage and/or energy level is achieved. The system and method described herein may be more accurate and precise at calculating the time required to reach the target than other charge time prediction systems at predicting the time to charge and/or discharge multiple battery packs of a powered system. For example, the charging of powered systems with multiple battery packs is more complex and difficult to predict than systems with only one battery pack, such as smartphones, laptops, and the like. The system and method described herein may be able to output times on the order of minutes, which enable efficient usage of the powered systems by limiting downtime in which the powered systems are finished charging and are not yet operating. The system and method enable precise scheduling of operations of the powered systems.

As used herein, the calculated time required to reach the target voltage or target energy level, when charging the battery packs, is referred to herein as a predicted charge time. The predicted charge time may refer to a top of charge, although need not represent a time that the battery packs are expected to reach a charge upper limit of the battery packs. The calculated time required to reach the target voltage or target energy level, when discharging the battery packs, is referred to as a predicted depletion time. The predicted depletion time may refer to a bottom of charge. The battery packs may not be fully depleted when the battery packs achieve the target voltage and/or target energy level, such that the predicted depletion time need not represent a time that the battery packs are expected to have no available charge remaining.

In an embodiment, the system may periodically reevaluate the predicted charge time and/or predicted depletion time to generate updated or revised times that are more accurate than earlier-generated times. The system may reevaluate the estimated time in real-time while the powered system is receiving electrical power from one or more power sources and/or supplying electrical power to one or more loads. The system may notify clients (e.g., operators) when the predicted charge time or depletion time is modified. The system separately may notify clients when the predicted charge time or depletion time is approaching, such as at designated intervals between the predicted time. The intervals may include five minutes, ten minutes, thirty minutes, and/or the like. Reevaluating the predicted time may be beneficial to account for recent changes to the powered system, the one or more power sources, and/or the one or more loads. In an embodiment, if the system determines that the updated charge time deviates from the predicted charge time, the system may take one or more responsive actions to reduce the deviation, such that the powered system reaches the target voltage or energy level at a time that is at or close to the earlier predicted charge time. For example, if the charging is behind schedule, then the system may increase the charging current that is transferred from the power source, reduce loads that draw electrical power, and/or the like. Conversely, if the charging operation is ahead of schedule, the system may decrease the charging current, increase the power drawn by the loads during the charge operation, and/or the like, or may simply notify the client that the charging will be completed earlier than previously predicted.

While one or more embodiments are described in connection with a rail vehicle system, not all embodiments are limited to rail vehicle systems. Unless expressly disclaimed or stated otherwise, the inventive subject matter described herein extends to other types of vehicles, such as buses, trucks (with or without trailers), automobiles, mining vehicles, agricultural vehicles, or other off-highway vehicles. The vehicles described herein (rail vehicles or other vehicles that do not travel on rails or tracks) can be part of a single vehicle system or a vehicle system of multiple vehicles. With respect to multi-vehicle systems, the vehicles can be mechanically coupled with each other (e.g., by couplers), or logically coupled but not mechanically coupled. For example, vehicles may be logically but not mechanically coupled when the discrete vehicles communicate with each other to coordinate movements of the vehicles with each other so that the vehicles travel together (e.g., as a convoy). The inventive subject matter described herein may also extend to non-vehicular powered systems that include multiple rechargeable battery packs to power operation of the powered systems. The powered systems may be located at manufacturing facilities and other industrial locations.

Figure 1:
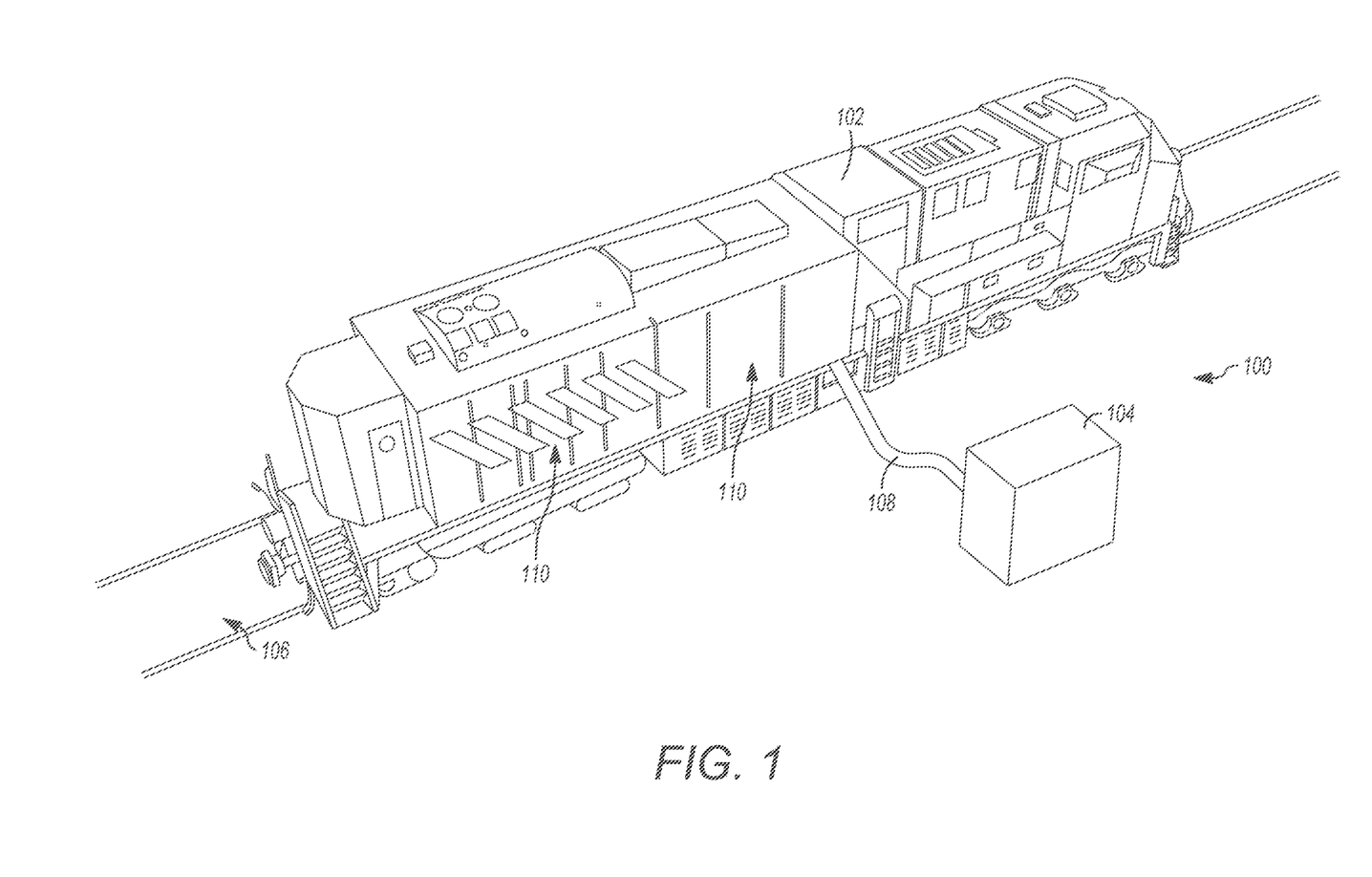
FIG. 1 is a perspective view of a power transfer system according to an embodiment.

FIG. 1 is a perspective view of a power transfer system 100 according to an embodiment. The power transfer system includes a powered system 102 and a power source 104. The powered system is a vehicle in the illustrated embodiment. The vehicle travels on a route 106. The vehicle in the illustrated example is a locomotive that travels on a track (e.g., railroad track) which represents the route. The power source may be a stationary structure (e.g., monument) located along a side of the route, and off-board the vehicle. The power source may be a wayside power supply system. The vehicle moves relative to the wayside power supply system as the vehicle travels along the route. In the illustrated embodiment, the vehicle stops at the wayside power supply system for a period of time to receive electrical power from the wayside power supply system for powering the vehicle. A charging cable 108 extends from the wayside power supply system to the vehicle to convey electrical power to the vehicle. The charging cable may plug into a charge port along a side of the vehicle to establish a conductive connection. The off-board system may have access to an electrical grid or network, a block of batteries, a generator, and/or the like. The electrical power received from the wayside power supply system may be directed to battery packs 110 onboard the vehicle for charging the battery packs. The battery packs store electrical energy that is used to power the movement of the vehicle. For example, electrical power is conveyed from the battery packs to one or more traction motors mechanically connected to axles and/or wheels of the vehicle. The traction motors generate torque that rotates the wheels and propels the vehicle along the route.

It may take hours to charge the battery packs of the vehicle to a target voltage and/or energy level, during which time the vehicle is not able to operate to travel on the route for transporting cargo and/or passengers. The vehicle may also block other vehicles from passing along the route and/or from charging at the wayside power supply system, which may further slow network throughput. The charge transfer timing system described herein may alleviate some of these issues by calculating the time required for the vehicle to charge the battery packs to the target voltage or energy level. This information may be used to increase transportation network efficiency and throughput by enabling more precise scheduling of the vehicle and other vehicles along the routes of the transportation network. For example, if the charge transfer timing system determines that the vehicle will reach the target voltage or energy level at 3:40 PM, then a yard planning system and/or movement planning system can schedule events based on that time. For example, the planning system(s) may schedule a crew to be onboard the vehicle by 3:40 PM, can schedule a trip or mission of the vehicle for shortly after 3:40 PM, can plan tractive and/or brake efforts of the vehicle for traveling along the route based on the 3:40 PM start time, and can even schedule another vehicle to charge at the wayside power supply system at 3:40 PM. If the other vehicle is scheduled for 3:40 PM, that vehicle may perform useful work until close to 3:40 PM and may only have to wait a short period, if any, before having access to the electrical power supply.

Optionally, the power transfer system may be operable for the powered system (e.g., vehicle) to supply electrical power from the onboard battery packs to the wayside system if necessary or desired. As such, the wayside system may function as a load that draws power from the powered system, via the charging cable, to recharge its own batteries, perform work, or the like.

Although the illustrated embodiment shows the vehicle charging while stationary, in one or more other embodiments the vehicle may be moving while power is being transferred. For example, the vehicle may be electrically connected to a powered third rail, a catenary line, an inductive coil, or the like, of the off-board power supply system (e.g., instead of the cable shown in FIG. 1). The embodiments described herein provide an estimated time until the vehicle energy storage system reaches a certain state of charge. In the moving vehicle example, the vehicle may not be able to transfer from a first route, along which the vehicle is being charged via a third rail, catenary, or the like, until the vehicle finishes charging. The system described herein can be used to plan when the vehicle is able to switch to a second route to travel to a designated destination, such as a facility to pick up and/or drop off passengers and/or cargo.

Figure 2:
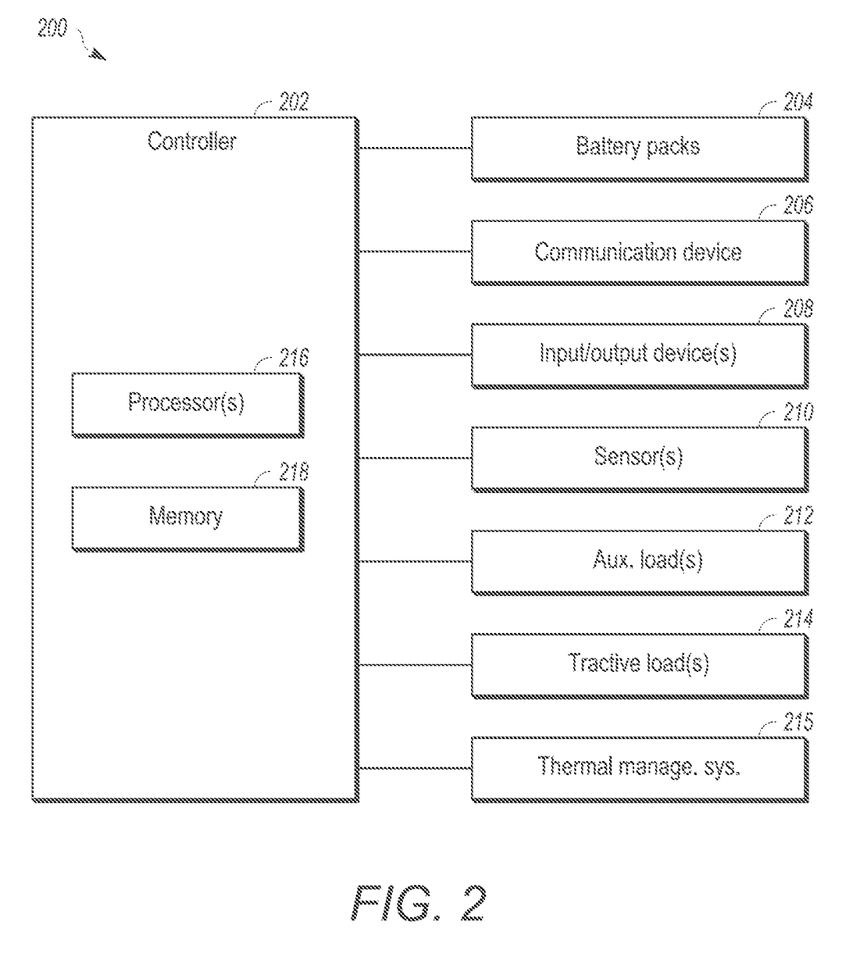
FIG. 2 is a block diagram of a charge transfer timing system according to an embodiment.

FIG. 2 is a block diagram of a charge transfer timing system 200 according to an embodiment. The charge transfer timing system in FIG. 2 may be disposed onboard a powered system. The powered system may be the vehicle shown in FIG. 1. The charge transfer timing system includes a controller 202 that performs some or all of the operations described herein to calculate the predicted charge time and/or the predicted depletion time, as well as supplemental actions performed based on the predicted charge time and/or depletion time.

The charge transfer timing system may also include battery packs 204, a communication device 206, at least one input/output device 208, one or more sensors 210, one or more auxiliary loads 212, one or more tractive loads 214, and a thermal management system 215. The battery packs may be the battery packs on the vehicle shown in FIG. 1. The controller may be operably connected to the other components of the charge transfer timing system via wired and/or wireless communication links to permit the transmission of information in the form of signals. For example, the controller may generate control signals that are transmitted to the other components to control operation of the components. The charge transfer timing system may have additional components that are not shown in FIG. 2. In an alternative embodiment, the charge transfer timing system may lack one or more of the components that are shown in FIG. 2. For example, if the powered system is not a vehicle, the charge transfer timing system may not include any tractive loads.

The controller represents hardware circuitry that includes and/or is connected with one or more processors 216 (e.g., one or more microprocessors, integrated circuits, microcontrollers, field programmable gate arrays, etc.). The controller may represent one or more control units or devices that are operably connected to perform the operations described herein. In an embodiment, the one or more processors may be disposed in a single, unitary control unit. In another embodiment, the controller may include multiple different control units, such as one control unit per axle of a vehicle. The processors may be distributed among the control units. Each axle-level control unit may determine part of the information specific to that axle, and may communicate with a higher level control unit of the controller to determine the output charge time.

The controller includes and/or is connected with a tangible and non-transitory computer-readable storage medium (e.g., data storage device), referred to herein as memory 218.

The memory may store program instructions (e.g., software) that are executed by the one or more processors to perform the operations described herein. The program instructions may include one or more algorithms utilized by the one or more processors to analyze various factors that affect charging and discharging of the battery packs, such as a current state of charge (SOC) of the battery packs, a pack configuration that represents a battery architecture of the battery packs, a charge capability of the at least one power source that supply charging power to the battery packs, and/or a depletion configuration of one or more loads of the powered system that are powered by the battery packs.

The program instructions may dictate actions to be performed by the one or more processors. One example action may be generating control signals to control the input/output (I/O) device to notify an operator of the predicted charge time and/or predicted depletion time. Other example actions may include generating control signals to communicate the predicted charge time or depletion time to a movement planning system and/or a yard planning system, controlling operating behavior of the powered system to modify the time to reach the target voltage and/or energy level, controlling the thermal management system to change a temperature of the battery packs, and/or the like. The memory may store additional information that is used by the controller. For example, the memory may include a database for storing information about the powered system, and specifically the components involved with electrical power transfer and storage. For example, the database may include information about the pack configuration of the powered system. The memory may also store a record or log of information over time, such as sensor data and/or derived data collected over many charge cycles of the battery packs over time. The memory optionally may store applications, such as various application program interfaces (APIs) that link to cloud hosting services, via the communication device, for accessing information from remote storage devices (e.g., servers).

The battery packs include groups of battery cells that store electrical energy. The battery cells may be arranged in parallel and/or series. In an embodiment, each battery pack includes cell groups connected in series and packaged together. The battery pack may represent the smallest replaceable unit of electrical energy storage onboard the powered system. The cell groups within the battery pack may include multiple battery cells arranged in parallel. In an embodiment, multiple battery packs may be connected to form a string. The battery packs in the string may be connected in series. The powered system may include one or more strings of battery packs. Multiple strings connected in parallel may represent a bank. References herein to battery packs are inclusive of the various ways that the packs can be assembled together within the powered system, such as strings, banks, modules, etc.

The pack configuration of the powered system may represent the number of battery packs (and/or cell sub-units) and how the battery packs are connected to each other onboard the powered system. Different powered systems may have different numbers of battery packs, different arrangements of battery packs, and different types of battery cells (e.g., lithium ion and variations thereof). The pack configuration affects how the battery packs charge and discharge. For example, a first battery pack may begin charging prior to a second battery pack during a charge cycle, based on the pack configuration. Optionally, both battery packs may charge during a common time period once the first battery pack reaches a voltage or energy level of the second battery pack. Differences in cell chemistry, number of cells, number of charge cycles experienced, and/or operating loads between the packs may cause the battery packs to have different charge capacities, health conditions, and/or the like, which also affect the charging and discharging properties.

Figure 3:
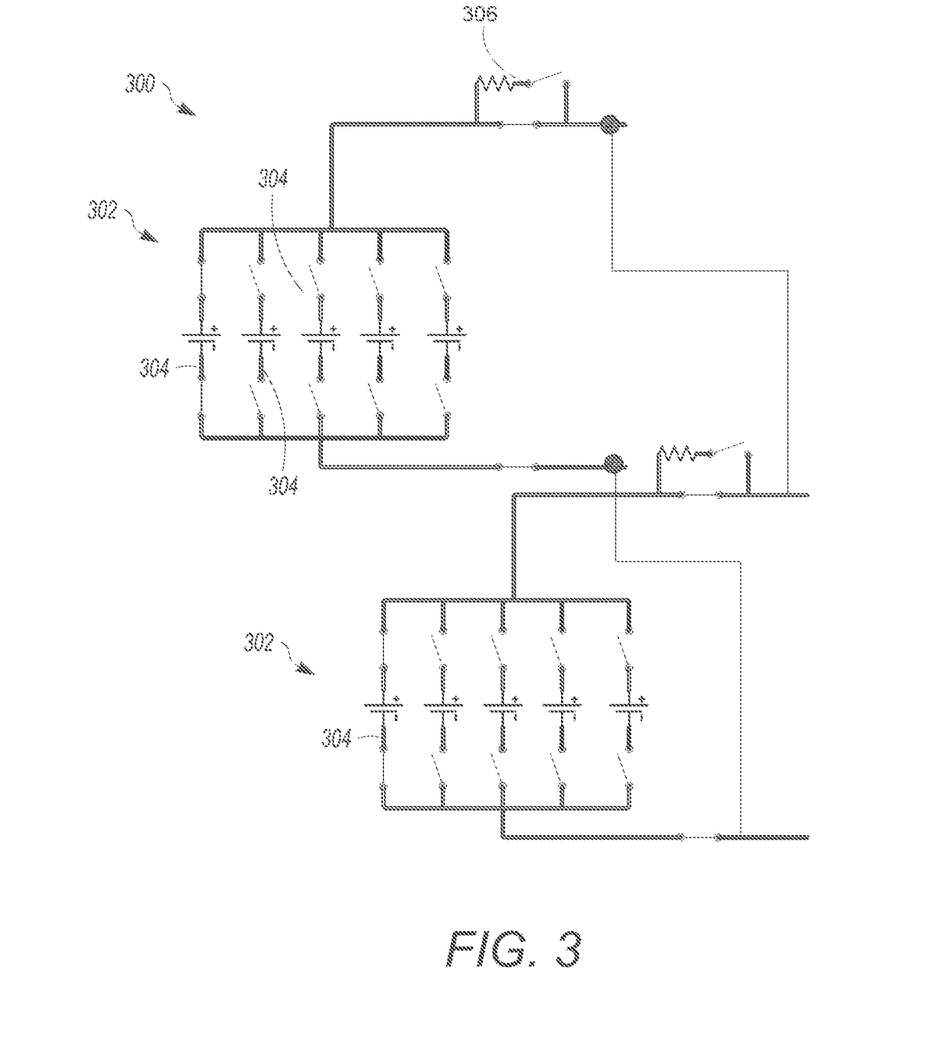
FIG. 3 is a diagram showing two battery banks of a vehicle according to an embodiment.

FIG. 3 is a diagram showing two battery banks 302 of a vehicle 300 according to an embodiment. The vehicle may represent the powered system shown in FIG. 1. The two banks may be connected in parallel in the illustrated embodiment. Each battery bank may include multiple strings 304 connected in parallel. The strings of a bank may be connected across a single axle of the vehicle or coupled axles of the vehicle. Each of the battery strings may include one or more battery packs, such as the battery packs shown in FIG. 2. The arrangement of the battery packs may be configurable by the controller via actuating switch devices 306. The switch devices are actuatable to selectively establish, and selectively break (e.g., block), conductive pathways with specific battery packs, strings, and/or banks to control which battery packs are connected to a power source for charging. The switch devices may include electromechanical devices, such as relays and/or contactors. Optionally, the switch devices may include solid state switches, such as field-effect transistors (e.g., metal-oxide-semiconductor field-effect transistors (MOSFETs)), insulated-gate bipolar transistors (IGBTs), and the like. The switch devices are communicatively connected to the controller via wireless or wired communication pathways, and are actuated via electrical signals (e.g., the presence and absence of an applied electrical voltage).

The controller may selectively actuate the switch devices to change an arrangement of the battery packs between charge cycles or even during a charge cycle. In an example in which an engine is used to power an alternator to generate electrical energy for charging the battery packs, the voltage necessary to fully charge the battery packs in the present arrangement to a fully charged state may be more than the engine is permitted or capable of supplying. In that case, the controller may actuate one or more of the switch devices to reconfigure the battery pack arrangement in order to reduce the voltage needed to reach the fully charged state. For example, if the present or pre-existing arrangement includes three packs in series and two strings, then the controller may reconfigure to a new arrangement in which the same energy storage devices are distributed among two packs in series and three strings. Reducing the number of packs in series may reduce the voltage needed to charge the battery packs. The engine and alternator may be able to charge the battery packs to the fully charged state in the new arrangement without modifying the engine or the alternator. Changing the battery configuration may not affect the charge time (or discharge time) because the energy needed to reach fully charged in both arrangements may be the same. The charging energy needed to reach fully charged may be a summation of the battery packs to be charged, regardless of arrangement, so the arrangement may not affect the charge time. The same is true for discharging operations and the estimated time to the depleted state. The controller may rearrange the battery packs for other purposes besides reducing the voltage requirement on the power source. For example, rearrangement may be desirable for transitioning between powering traction loads from powering auxiliary loads (and vice-versa), conditioning packs, and/or the like.

Referring now back to FIG. 2, the communication device represents hardware circuitry that can communicate electrical signals via wireless communication pathways and/or wired conductive pathways. The controller may receive sensor data generated by the sensors via the communication device. The communication device may include transceiving circuitry, one or more antennas, and the like, for wireless communication. The communication device may communicate directly with a client computer device (e.g., smartphone, tablet computer, laptop computer, etc.) or indirectly via a cellular tower, a modem, a router, and/or the like. For example, the controller may control the communication device to send a notification to the client computer device. The notification may include the predicted charge time and/or the predicted depletion time.

The I/O device allows an operator to receive information from the controller and optionally to interact with the charge transfer timing system to generate user inputs. The I/O device may include one or more input devices designed to generate user command signals (e.g., selections) based on user manipulations. For example, the input device(s) may include or represent a touch sensitive screen or pad, a mouse, a keyboard, a joystick, a switch, a microphone, physical buttons, and/or the like. The I/O device may include a display device having a display screen that presents graphical indicia, such as text and symbols, for viewing by the user. The controller may notify an operator of the predicted charge time and/or predicted depletion time by displaying a message on the screen of the display device.

The one or more sensors may monitor properties of the powered system and/or of the one or more power sources that supply electrical power to the powered system. The sensors may include current sensors and/or voltage sensors that monitor electrical energy stored in the battery packs and/or conducted through the charge transfer timing system. The sensors may include one or more temperature sensors that monitor a temperature of the battery packs and/or a temperature of the powered system proximate to the battery packs. For example, a temperature sensor may monitor the temperature of the air within a compartment or room surrounding the battery packs. The sensors may generate sensor data based on the corresponding properties that are monitored. The sensor data may be conveyed to the controller in the form of electrical sensor signals.

The auxiliary loads and the tractive loads are onboard the powered system and may draw electrical power from the battery packs during operation of the powered system. For example, the auxiliary loads may include lighting systems, HVAC systems, electronic systems, radio and other communication systems, sensor systems, auxiliary motors (not used for propulsion), and the like. The tractive loads may be loads that support propulsion of the powered system. The tractive loads may include traction motors and associated circuitry. In an embodiment, one or more of the auxiliary loads may draw electrical power from the battery packs while the powered system is stationary.

The thermal management system may be an active device or assembly that is designed to alter a temperature of the battery packs. For example, the thermal management system may include one or more fans for moving air and dissipating heat from the battery packs. The thermal management system may include a liquid cooling system with one or more pumps for moving a liquid coolant to absorb heat from the battery packs. Optionally, the thermal management system may include an air-conditioning system that uses a coolant to chill air for absorbing heat from the battery packs. The fan(s), liquid cooling system, and/or air-conditioning system may be activated to cool the battery packs. In cold environments, the thermal management system may include a heater designed to increase the temperature of the battery packs when active.

In an embodiment, the controller calculates the time required to charge the battery packs to a target voltage and/or a target energy level. The target voltage may represent energy per charge, whereas the target energy level is a magnitude of energy. The target voltage and/or target energy level may be selected by an operator using the I/O device, a default setting stored in the memory of the controller, and/or the like. For example, a default setting may be to charge the battery packs during a charge cycle to a designated voltage. Optionally, the controller may characterize the target voltage and/or energy level as a percentage based on the charge capacity of the battery packs. In that case, the target voltage and/or energy level may be a designated percentage (e.g., charge level) of full charge, such as 80%, 90%, or the like. The controller may not charge the battery packs to 100% capacity during normal operation to conserve battery life. Different cell chemistries may enable charging to different charge levels without substantially affecting battery life.

The time required to charge the battery packs to the target voltage and/or energy level (e.g., the predicted charge time) may be based on various factors analyzed by the controller. For example, the controller (e.g., algorithm) may analyze factors such as battery packs in parallel connecting to the power sources at different times, capabilities and limits of the battery packs, stability and limits of the power source(s), charge dynamics independent of architecture, varying auxiliary loads, various component ratings, and the like. The various component ratings may include ratings of hardware components such as chargers, reactors, diodes, receptacles, cables, pantographs, and the like.

One factor is the current state of charge (SOC) of the battery packs. The current SOC provides the initial baseline energy level of the battery packs, which provides an indication of how much electrical power needs to be transferred before the battery packs achieve the target voltage and/or energy level. The current SOC may be in terms of a percentage of full charge and/or in units such as amp hours, kilowatt hours, or the like. The current SOC affects the charge time because a first battery cell that is fully depleted would take longer to charge to a target charge level than a second battery cell that is only semi-depleted, assuming the electrical power transfer rate is the same. The current SOC may be determined based on sensor data generated by the one or more sensors. Voltage and/or current sensors may monitor the electrical power supplied to the battery cells, the electrical power supplied from the battery cells, and/or the like to determine the current SOC. The current SOC may be a value that is relative to a charge capacity of the battery packs. For example, the current SOC of each battery pack may represent the current voltage or energy level of the cells in the battery pack relative to the charge capacity of the cells in the battery pack. The charge capacity may represent the total amount of energy that can be stored by the battery packs. The charge capacity may be a property that has a known (or predicted) value stored in the memory. The charge capacity may diminish over time as the resistance and/or degradation of the cell increases. The diminishment of charge capacity may be based on cell chemistry, usage of the batteries, number of charge cycles, age of the batteries, and/or the like. The controller may account for the reduction of charge capacity of time when determining the current SOC of the battery packs.

Some additional factors analyzed by the controller to determine the predicted charge time relate to charge capabilities of various current-conducting components. The charge capabilities represent limits to the supply of electrical power to the battery packs. One factor is the charge capability of the at least one power source that supplies charging power to the powered system. The charge capability of the power source(s) represent the maximum power input to the powered system. The charge capability of the power source(s) may be a designated power level based on regulations, standards, utility capability, or the like. The actual power that is received by the powered system may be less than the charge capability of the power source(s) due to limiting factors, such as the charge capability of the power cable (e.g., the cable 108 in FIG. 1) and other circuitry coupling the battery packs with the power source(s). For example, the circuitry of the powered system that directs the received electrical power to the battery packs may not be designed to accommodate the full charge capability of the power source(s), so the circuitry may be a limiting factor. The circuitry may include circuit devices, such as reactors, diodes, connectors, and/or the like. The charge capability of the battery packs of the powered system may be another limiting factor that limits the electrical power received by the powered system. The charge capability of the battery packs represents the upper power or charge limit that the battery packs are designed to receive to avoid undue degradation of the cells and/or risk of fire or other damage. The controller may estimate or predict the electrical power that will be transferred to the powered system during a charge cycle based on the charge capability of the power source(s) and any limiting factors that would limit that charge capability, such as the charge capabilities of the circuitry and the battery packs. Optionally, the controller may monitor the magnitude of electrical power received from the power source(s) over time during a charge cycle based on sensor data of current sensors, voltage sensors, and/or the like, and may refer to that historical data to determine the electrical power that will be transferred to the powered system during a future charge cycle.

Another factor used by the controller to determine the predicted charge time is the pack configuration of the battery packs. As described above, the pack configuration may identify a sequence or order in which the battery packs are connected with the power source(s) that supply charging power to the powered system. The sequence or order may include the specific arrangement of the battery packs in strings (e.g., in series and/or parallel) relative to the power source(s), such as which battery packs receive power before other battery packs. The sequence may also include additional characteristics, such as the total number of battery packs, the total number of strings, the number of battery packs in each string, the arrangement of strings in the banks (e.g., in series and/or parallel), and/or the like. The strings also may be distributed among different portions of the powered system, such as different axles when the powered system is a vehicle. The predicted charge time may be based, at least in part, on the sequence or order in which the battery strings are connected with the power source(s). For example, different battery packs in the powered system may have different limitations and/or restrictions, such that not all battery packs can be charged at the same time. Each axle of a vehicle may have its own degree of freedom to control the charging power received. Different axles may have different power limits, such as DC power limits, which represent limiting factors that are based on the pack configuration. The pack configuration may be relatively static and unchanging. Alternatively, the controller may actuate one or more switch devices to change an arrangement of battery packs in the pack configuration, such as be redistributing the packs into different numbers of strings, without changing the number of battery packs (or total energy needed) to charge. Changing the arrangement without affecting the total energy may not affect the estimated charge time. Information related to the pack configuration may be stored in the memory and accessed by the one or more processors of the controller.

Figure 4:
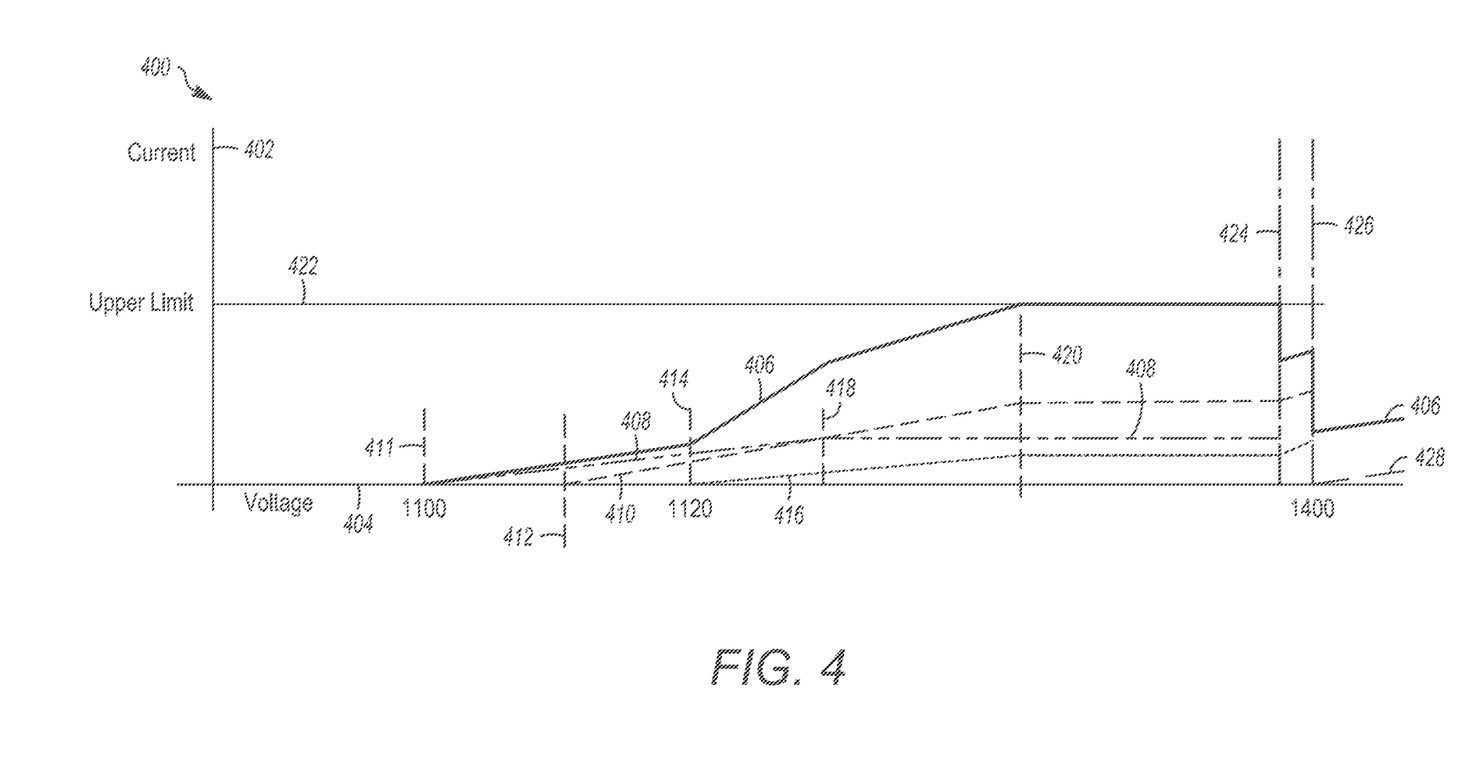
FIG. 4 is a graph showing current relative to voltage during an example charge cycle according to an embodiment.

FIG. 4 is a graph 400 showing current relative to voltage during an example charge cycle according to an embodiment. The graph represents a sequence of events as the different battery packs of a powered system receive charging power from one or more power sources. The vertical axis 402 is current, and the horizontal axis 404 is voltage. The current and voltage are properties of the electrical power that is transferred from the power source(s) to the battery packs during the charge cycle. Initially, there is no electrical power transfer, so the current and voltage are zero. In the illustrated example, the powered system may receive electrical power from a single input (e.g., charger input).

The charge sequence may first involve increasing the voltage in the battery pack that has the lowest voltage of the battery packs. When the battery packs are arranged in strings, the string that has the lowest voltage relative to the other strings may receive power first. The power transfer may commence upon the charger voltage exceeding the voltage of the lowest-voltage string. In the illustrated embodiment, the electrical power is initially transferred to the powered system at a first voltage 411. The first voltage may be 1100 V in the illustrated example. The voltage in the string gradually increases. The current also gradually increases. Eventually, the charge voltage reaches the voltage of a second string of one or more battery packs. The two strings may be close enough in voltage to enable the two strings to be charged during a common time period. For example, once the voltage reaches a second voltage 412, the charging power may be distributed to both of the strings. The second voltage may be about 1112 V in the illustrated example. The voltage may continue to increase gradually. Once the voltage reaches a third voltage 414, the charging power may be distributed among the first string, the second string, and a third string of one or more battery packs.

In FIG. 4, the trend line 406 represents total charging current versus voltage transferred to the powered system. The trend line 408 represents the charging current versus voltage of the first battery string of one or more battery packs. The trend line 410 represents the charging current versus voltage of the second battery string of one or more battery packs. The trend line 416 represents the charging current versus voltage of the third battery string of one or more battery packs. The total charging current represents the aggregate of the charging currents of the battery packs that are being charged at a given time. The total charging current and the charging current of the first battery string are the same until the second battery string starts to receive charging power at the voltage 412 (e.g., on or about 1112 V in the illustrated example). When the voltage is above 1120 V, such as at 1150 V, the total charging current is the sum of the three individual charging currents. When the multiple sets or strings of battery packs are charging in parallel during a common time period, the total charging current increases with increasing voltage.

When a fourth voltage 418 is reached, one of the battery strings may function as a limiting factor to limit the overall charging power. For example, the first string that started charging at 1100 V may reach a current limit that is based on battery component ratings. At voltages above the fourth voltage, the current of the first string may remain constant. This change is reflected by the decrease in the positive slope of the total charging current line. The current of the second and third strings continues to increase while the current of the first string is constant. The increasing current to the second and third strings causes the total charging current to continue to increase until a fifth voltage 420 is reached.

At the fifth voltage, the powered system reaches a current upper limit 422. The current upper limit is a restriction that may be defined by a most limiting component. For example, the current upper limit may represent the charge capability of the power source(s), the charge capability of the battery packs, or the charge capability of the hardware and circuitry that conductively connects the power source(s) to the battery packs, whichever charge capability is least. In an embodiment, the most limiting component may be the charger component (e.g., connector), the power cable extending from the power source to the powered system, a pantograph, or the like. The current of the charging power cannot exceed the upper limit. As a result, the total charging current is held constant at the upper limit even as the voltage is increased beyond the fifth voltage. The individual charging currents are held constant at voltages above the fifth voltage, at least until a sixth voltage 424 is reached.

At the sixth voltage, the first battery string reaches the top of charge, meaning that the target voltage and/or power level is achieved in the battery pack(s) of the first string. The controller disconnects the first battery string from the charging power. For example, the controller may actuate one or more switch devices (e.g., contactors, relays, solid state switches, etc.) to break a conductive pathway between the charger of the power source(s) and the first battery string. Removing the first battery string causes the total charging current to drop below the upper limit, which enables the second and third battery strings to charge at greater current levels at voltages above the sixth voltage.

When the voltage reaches a seventh voltage 426, the second and third battery strings may reach the top of charge. The seventh voltage may be around 1400 V in the illustrated example. The controller disconnects the second and third battery strings. At this stage, the controller may connect a fourth battery string to the charger of the power source(s) to start charging the fourth battery string. A trend line 428 represents the charging current versus voltage (e.g., fourth charging current) of the fourth battery string of one or more battery packs. Due to the pack configuration, the fourth battery string may not begin charging until the first, second, and third strings have fully charged to the target voltage and/or power level.

The controller may consider this sequence when calculating the time required to charge the battery packs to the target voltage and/or target energy level. In an embodiment in which the powered system only has the first, second, and third battery strings to charge (e.g., not the fourth string), the controller may calculate the time required to go from the initial charging of the first string at the first voltage (e.g., 411) to the time at which the second and third strings are disconnected at the seventh voltage (e.g., 426).

The controller may consider additional factors to determine the predicted charge time. For example, fault statuses of the battery packs and/or imbalances of the battery packs may factor into the calculation. The controller may connect the strings of battery packs to the power source(s) in a sequence or order that is based on a fault status of at least one battery pack of the strings and/or an imbalance in the SOCs of the strings. The fault status and/or imbalance may be a reason that at least some of the strings are not able to be connected to the power sources during a common time period. A battery string that is faulted may not receive charging current. The controller may predict that a faulted string will become unfaulted during the charge cycle, such that the newly-unfaulted string represents another set of battery packs to which charging power is allocated.

Another factor that may affect the predicted charge time is the presence of any loads that will be drawing power during the charge cycle. For example, the charging power that is received by the battery packs is the net power in excess of any power that is diverted to loads. The loads can include the auxiliary loads and/or the tractive loads described in FIG. 2. For example, assuming that the charging power received from the power source(s) represents the charge capability of the power source(s), the net power that is actually used for charging the battery packs may be the charge capability minus power diverted to auxiliary loads and minus power diverted to tractive loads. If the powered system is stationary, there may be no power directed to tractive loads. The controller may monitor the power consumed by the one or more loads, particularly during charge cycles. The controller may calculate the predicted charge time based on the power consumed by the load(s), because only the net of the charge capability (e.g., the input charging power) minus the power consumed by the load(s) can be used to charge the battery packs.

The temperature of the battery packs may represent another factor relied on by the controller to calculate the time required to charge the battery packs. For example, the battery packs may not charge well (or it may not be safe to charge the battery packs) when the temperature of the battery packs is outside of a designated temperature range (e.g., below a lower threshold temperature and above an upper threshold temperature). The battery packs may be able to charge faster (e.g., accept greater charging power) when the temperature is within the designated temperature range relative to the temperature being outside of that range. The controller may monitor the temperature of the battery packs via a temperature sensor.

One type of auxiliary load may be a temperature management system. The controller may activate the temperature management system to change the temperature of the battery packs. If the temperature is below the lower threshold, the controller may control the thermal management system to heat the battery packs to increase the temperature above the lower threshold temperature. Conversely, if the temperature is above the upper threshold, the controller may control the thermal management system to cool the battery packs to decrease the temperature below the upper threshold temperature. Actuating the thermal management system to modify the temperature of the battery packs may reduce the time required to charge the battery packs, relative to charging the battery packs at temperatures outside of the designated temperature range.

The controller may determine the predicted charge time by determining the net charging power, which is the gross charging power received by the one or more power source(s), restricted by any limiting factors, minus any power distributed to loads. The controller also determines the amount of electrical energy (or charge) that the battery packs need to reach the target voltage and/or energy level based on the determined SOC of the battery packs. The time required to charge the battery packs may not be simply the total energy (or charge) needed divided by the net charging power, due to various restrictions and limiting factors. For example, the controller may predict the sequence of events shown in FIG. 4, including various battery packs (e.g., strings) connecting and disconnecting from the charging power at different times and at different voltages. The sequence of events may be based on battery charge limits and characteristics, changes in auxiliary and/or tractive loads during the charge cycle, different components becoming the limiting factor, and/or the like.

In an embodiment, the controller may estimate the time period required for each of multiple different stages of the charge cycle, and then may aggregate the time periods to calculate the time required to charge the battery packs to the target voltage and/or energy level. The stages could be the times between the different voltages 411, 412, 414, 418, 420, 424, and 426 shown in FIG. 4. For example, the controller may estimate that the first stage from voltage 411 to voltage 412 would take 15 minutes, the second stage from voltage 412 to voltage 414 would take 40 minutes, the third stage from voltage 414 to voltage 418 would take 20 minutes, the fourth stage from voltage 418 to voltage 420 would take 30 minutes, the fifth stage from voltage 420 to voltage 424 would take 10 minutes, and the sixth stage from voltage 424 to voltage 426 would take 20 minutes. Assuming that only the three battery strings would need to be charged (not the fourth that starts charging at voltage 426), the controller can aggregate these times to calculate the predicted charge time. In this hypothetical example, the calculated time required for the battery packs to reach the target voltage and/or energy level would be 2 hours and 15 minutes from the start time (at voltage 411).

After calculating the time required to reach the target charge level, the controller may notify one or more operators. For example, the controller may send a notification (via the communication device in FIG. 2) indicating the time required to charge the battery packs to the target voltage and/or energy level. The notification may be presented to the operator on a display screen, such as a smartphone, tablet computer, laptop computer, workstation, wearable computer (e.g., smartwatch, etc.), or the like. The time may be presented to the operator as an absolute time (e.g., 3:46 PM) or as a time relative to the current time (e.g., 1 hour, 43 minutes remaining until fully charged). The time may be presented as a timer that counts down. One of the operators that receives the notification from the controller may be an operator onboard the powered system and/or an operator that is part of a crew assigned to the powered system. The notification may provide the operator an estimate of how much time the operator has before the powered system is finished charging and available to active duty. The notification allows the crew and/or other assets to prepare for the powered system to be operational, which can benefit scheduling and fleet usage.

Optionally, the controller may send the notification to a yard planning system and/or a movement planning system. The yard planning system may control the movement of assets, such as vehicles, within a yard. Based on the calculated time remaining until a first powered system is charged, the yard planning system can schedule a second powered system to begin charging at the same power source(s) immediately after the first powered system completes charging. The movement planning system may control tractive and braking settings of a vehicle that represents the powered system. Based on the calculated time remaining until the vehicle is charged, the movement planning system can generate a trip plan for the vehicle to travel along a route to a destination location. The trip plan may designate tractive settings and/or brake settings to be implemented during the trip to increase fuel efficiency, reduce noise, and/or the like relative to traveling according to different settings.

In an embodiment, the controller may repeat the predicted charge time calculation during the charge cycle (e.g., while the powered system is receiving charging power from the power source(s)). The controller may repeat the calculation periodically, such as once every five minutes, while the battery packs are being charged. Repeating the calculation allows the controller to provide updated or revised predicted charge times to the operators. The predicted charge time may be updated or revised based on changes to operating conditions subsequent to when the predicted charge time was initially calculated. The changes in the operating conditions may represent a change in auxiliary loads of the powered system that draw power during the charge cycle, a change in tractive loads of the powered system that draw power during the charge cycle, and/or a change in temperature of or around the powered system. As described above, the temperature of the battery packs may affect the charging rate, particularly if the temperature of the battery packs falls outside of the designated temperature range.

If the revised or updated predicted charge time differs from the initial predicted charge time by more than a tolerance threshold (e.g., 5 minutes, 10 minutes, or the like), then the controller may send another notification that provides the updated predicted charge time. The notification may include an alert to identify that the predicted charge time has changed relative to the previous predicted charge time.

In an embodiment, the controller may repeat the calculation when triggered by a stimulus or event. For example, if at least one of the battery packs is replaced, the controller may calculate the predicted charge time using the information about the new battery pack. The controller may compare the new predicted charge time of the new battery pack with a previous predicted charge time of the replaced battery pack, and may use the calculated difference in charge time to adjust plans or schedules that were generated based on the previous predicted charge time. Another triggering event may be a detected change in a health state of at least one of the battery packs. The change in health state may be determined based on a detected change in cell resistance, charge capacity, or the like. If the health state of at least one battery pack is determined to have changed, the controller may repeat the charge time calculation. Another triggering event for repeating the calculation may be a detected change in temperature of the battery packs. For example, if the temperature of the battery packs falls below the lower threshold temperature, the controller may repeat the calculation to determine a revised charge time.

In an embodiment, if the revised charge time during the charge cycle indicates that it will actually take longer to complete the charging than initially calculated, the controller may take one or more actions to increase the charge speed of the battery packs. Optionally, any such actions may be presented to an operator for approval, via the I/O device, before implementing such actions. One or more of these actions may be performed to reduce the time required to charge the battery packs to the target voltage and/or energy level. For example, a client may have scheduled one or more events based on the initial predicted charge time. The controller may attempt to increase the charging speed, if the updated predicted charged time is slower, in an attempt to meet the initial communicated time.

For example, in order to increase the charging speed, the controller may deactivate auxiliary loads that are drawing power. In another example, the controller may increase the charging power received by the powered system. The controller may determine the health state of the battery packs prior to increasing the charging power supplied to the battery packs, to ensure that the battery packs are in a sufficient condition to accept the increased charging power. Increasing the charging power may have a detrimental effect on the battery lifespan. As such, the controller may take this action only in urgent or priority cases, and/or in response to operator approval. In another example, the controller may control the thermal management system to change the temperature of the battery packs, such as by heating or cooling the battery packs to a temperature that allows the battery packs to charge faster. Another example may include the controller controlling an auxiliary power source to generate electrical power that supplements the charging power received from the one or more power source(s). The auxiliary power source may be a generator, fuel cell, or the like that converts the chemical energy in fuel to electrical energy. Alternatively, the auxiliary power source may be one or more batteries that are charged and are discrete from the battery packs. The auxiliary power source may be onboard the powered system or next to the powered system.

Alternatively, if the updated charge time indicates that the battery packs will complete charging earlier than initially calculated, the controller optionally may take one or more actions. For example, the controller may send a notification to an operator informing the operator that the powered system will be ready for duty earlier than initially communicated. The controller may prompt the operator to ask whether to slow the charging speed such that the battery packs reach the target voltage and/or energy level closer to the initially-calculated time. If the operator approves, the controller may decrease the charging power supplied to the battery packs to slow the charge speed. Decreasing the charging power may prolong the battery life of the battery packs. In another example, the controller may divert more of the charging power received from the power source(s) to loads, such as to auxiliary loads.

The description above concerns determining the time required to charge the battery packs to the target voltage and/or energy level. In an embodiment, the charge transfer timing system may determine the time required to deplete the battery packs of the powered system to a target voltage and/or energy level. For example, the controller may perform similar calculations regarding discharge power that is supplied by the battery packs to one or more loads of the powered system, in order to determine the time until the battery packs are depleted (e.g., at the target voltage and/or energy level). The target voltage and/or target energy level used for the depletion calculation may be different (e.g., lower) than the target voltage and/or target energy level used for the charge calculation. The discharge power may be more variable than the charge power, as the discharge power is affected by changing operating conditions. The current-usage at the state of charge may be used to determine the predicted depletion time.

In an embodiment, the controller may determine a depletion configuration of one or more loads of the powered system, which are powered by the battery packs. The controller utilizes the depletion configuration as a factor to determine the predicted depletion time. Additional factors may include the current SOC of the battery packs and the pack configuration of the battery packs. The depletion configuration refers to the discharge power that is drawn by the loads over time. For example, not all of the loads may draw power from the battery packs during a common time period. As the powered system operates, different loads may start and stop drawing power from the battery packs at different times. One load may also change how much power is drawn over time, such as increasing from a first non-zero electrical power to a second electrical power that is greater than the first electrical power.

The depletion configuration may be based on operating conditions of the powered system. The changes to the one or more operating conditions may include a change in auxiliary loads of the powered system, a change in tractive loads of the powered system, and/or a change in temperature of or around the powered system. In an embodiment, the controller may model or predict the discharge power to the different loads in a manner similar to the graph shown in FIG. 4. For example, the controller may determine that the different battery packs may supply discharge power to different load starting different times based on power transfer limits or restrictions, battery pack arrangements, and/or the like. The controller may repeatedly calculate the predicted depletion time based on detected changes to the one or more operating conditions.

The predicted depletion time may provide an operator information useful for determining when the powered system will need to charge again. For example, the predicted depletion time may predict the time remaining according to current and predicted operation of the powered system and the loads thereof, until the battery packs reach the depleted state. The operator may schedule movement of the powered system, operation of the powered system, and/or the like such that the powered system is able to access one or more power source(s) before or by the predicted depletion time. In an embodiment, the controller may extend the time until the battery packs reach the depleted state by deactivating one or more loads, reducing the discharge power supplied to the loads, and/or the like.

In an example use case in which the powered system is a vehicle, the predicted depletion time may be utilized to identify one or more locations to add or remove one or more charging stations. For example, if the predicted depletion time is less than the time it would take for a vehicle to travel from one charging station to another charging station along a route, then the controller may determine that a third charging station should be added between the existing two.

In another example use case, the controller may monitor the time required to charge the same powered system over time and/or monitor the time required to charge other powered systems over time. The controller may aggregate such data and analyze the historical data to predict an upcoming change in operational state of the battery packs in at least one of the powered systems based on a comparison of the predicted charge times. Similarly, the controller may calculate the time required to charge the battery packs in each of the powered systems. The controller may predict an upcoming change in an operational state of at least one of the power sources based on a comparison of the times required to charge the battery packs among the power sources.

Figure 5:
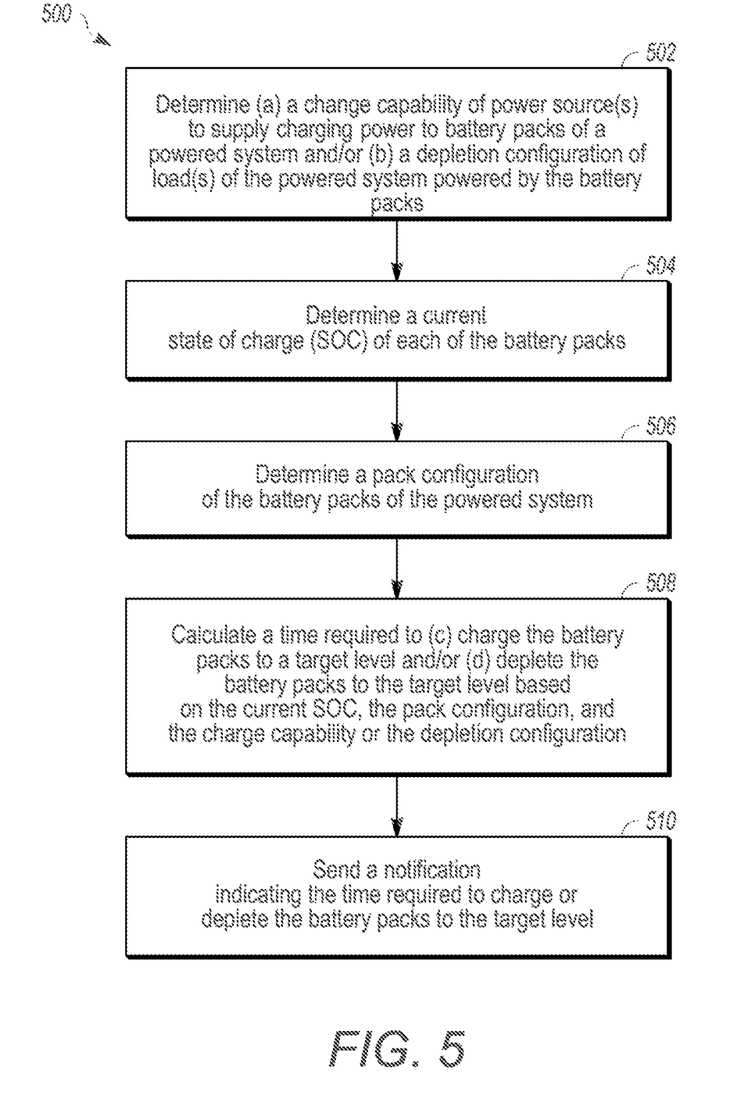
FIG. 5 is a flow chart of a method of calculating a charge transfer time according to an embodiment.

FIG. 5 is a flow chart of a method 500 of calculating a charge transfer time according to an embodiment. The method may be performed in whole or in part by the controller of the charge transfer timing system shown in FIG. 2. The method optionally may include more steps than shown, fewer steps than shown, and/or different steps than shown in FIG. 5. At step 502, one or more of (a) a charge capability is determined or (b) a depletion configuration is determined. The charge capability is the charge capability of one or more power sources that supply charging power to multiple battery packs of a powered system. The depletion configuration is the depletion configuration of one or more loads of the powered system that are powered by the battery packs.

At step 504, a current state of charge (SOC) of each of the battery packs is determined. At step 506, a pack configuration of the battery packs of the powered system is determined.

At step 508, a time required to (c) charge the battery packs to a target level and/or (d) deplete the battery packs to the target level is calculated. The target level may be a target voltage and/or target energy level. The time required to charge and/or deplete the battery packs is calculated based on the current SOCs of the battery packs, the pack configuration, and the charge capability and/or the depletion configuration. For example, the charge capability is used to calculate the time required to charge the battery packs, and the depletion configuration is used to calculate the time required to deplete the battery packs.

At step 510, a notification is sent that indicates the time required to charge or deplete the battery packs to the target level. The notification may be a message that is wirelessly transmitted to a computer device of an operator, such as a smartphone, laptop, tablet computer, smartwatch, or the like.

In one or more embodiments, a charge transfer timing method is provided that may include determining one or more of (a) a charge capability of one or more power sources configured to supply charging power to multiple battery packs of a powered system or (b) a depletion configuration of one or more loads of the powered system configured to be powered by the battery packs. The method may include calculating a time required to one or more of (c) charge the battery packs to at least one of a target voltage or a target energy level or (d) deplete the battery packs to the at least one of the target voltage or the target energy level. The time required may be based at least in part on a current state of charge (SOC) of the battery packs, a pack configuration of the battery packs, and the one or more of the charge capability or the depletion configuration.

Optionally, the time required to charge the battery packs to the at least one of the target voltage or the target energy level may be calculated. Optionally, the battery packs may be arranged in multiple battery strings, and the time required to charge the battery packs may be based at least in part on a sequence or order in which the battery strings are connected with the one or more power sources. The method may include connecting the battery strings to the one or more power sources in the sequence or order that is based at least in part on one or both of a fault status of a battery pack of the battery strings or an imbalance in the SOCs of the battery strings. Optionally, the time required to charge the battery packs may be calculated based on a charge capability of the battery packs, the charge capability of the one or more power sources, and a charge capability of circuitry coupling the battery packs with the one or more power sources. Optionally, the time required to charge the battery packs may be calculated based on power consumed by one or more loads during charging of the battery packs.

Optionally, the time required to charge the battery packs may be repeatedly calculated while the battery packs are being charged. The time required to charge the battery packs may be repeatedly calculated responsive to one or more of replacement of at least one of the battery packs or a change in health state of at least one of the battery packs. The time required to charge the battery packs may be repeatedly calculated responsive to a change in temperature of the battery packs.

Optionally, the time required to charge the battery packs may be calculated based on a temperature of the battery packs. The method may include reducing the time required to charge the battery packs, relative to the time that is calculated, by controlling a thermal management system that changes a temperature of the battery packs.

Optionally, the time required to deplete the battery packs to the at least one of the target voltage or the target energy level may be calculated. The time required to deplete the battery packs may be based on one or more operating conditions of the powered system. The one or more operating conditions of the powered system my change, and the time required to deplete the battery packs may be repeatedly calculated based on changes to the one or more operating conditions. The changes to the one or more operating conditions may include one or more of a change in auxiliary loads of the powered system, a change in tractive loads of the powered system, or a change in temperature of or around the powered system.

Optionally, the method includes sending a notification indicating the time required to one or more of charge or deplete the battery packs to the at least one of the target voltage or the target energy level. The method may include identifying one or more locations to add or remove one or more charging stations based on the time required to one or more of charge or deplete the battery packs that is calculated. The method may include communicating the time required to one or more of charge or deplete the battery packs to one or more of a movement planning system or a yard planning system. The method may include determining a health state of the battery packs, and changing the time that is calculated to charge the battery packs to the at least one of the target voltage or the target energy level, relative to the time that is initially calculated, based at least in part on the health state of the battery packs by controlling the charging power supplied to the battery packs by the one or more power sources.

Optionally, the powered system is one of plural powered systems. The method may include calculating the time required to charge the battery packs in each of the powered systems, and predicting an upcoming change in an operational state of the battery packs in at least one of the powered systems based on a comparison of the times required to charge the battery packs among the powered systems. Optionally, the one or more power sources include plural power sources. The method may include calculating the time required to charge the battery packs in each of the powered systems, and predicting an upcoming change in an operational state of at least one of the power sources based on a comparison of the times required to charge the battery packs among the power sources.

In one or more embodiments, a charge transfer timing system is provided that includes a controller that may have one or more processors. The controller may be configured to determine one or more of (a) a charge capability of one or more power sources configured to supply charging power to multiple battery packs of a powered system or (b) a depletion configuration of one or more loads of the powered system configured to be powered by the battery packs. The controller may be configured to calculate a time required to one or more of (c) charge the battery packs to at least one of a target voltage or a target energy level or (d) deplete the battery packs to the at least one of the target voltage or the target energy level. The controller may be configured to calculate the time required based at least in part on a current state of charge (SOC) of the battery packs, a pack configuration of the battery packs, and the one or more of the charge capability or the depletion configuration.

Optionally, the controller is configured to calculate the time required to charge the battery packs to the at least one of the target voltage or the target energy level. The battery packs may be arranged in multiple battery strings, and the pack configuration may include a sequence or order in which the battery strings are connected with the one or more power sources. Optionally, the system may include one or more switch devices communicatively connected to the controller, and the controller is configured to actuate the one or more switch devices to modify an arrangement of the battery packs within the battery strings. The controller may be configured to calculate the time required to charge the battery packs based on a charge capability of the battery packs, the charge capability of the one or more power sources, and a charge capability of circuitry coupling the battery packs with the one or more power sources. Optionally, the controller may be configured to calculate the time required to charge the battery packs based on power consumed by one or more loads during charging of the battery packs. The controller may be configured to repeatedly calculate the time required to charge the battery packs while the battery packs are being charged. Optionally, the controller may be configured to repeatedly calculate the time required to charge the battery packs responsive to one or more of replacement of at least one of the battery packs or a change in a health state of at least one of the battery packs. The controller may be configured to repeatedly calculate the time required to charge the battery packs responsive to a change in temperature of the battery packs.

Optionally, the controller is configured to calculate the time required to charge the battery packs based on a temperature of the battery packs. Optionally, the controller is configured to reduce the time required to charge the battery packs, relative to the time that is calculated, by controlling a thermal management system that changes a temperature of the battery packs.

Optionally, the controller is configured to calculate the time required to deplete the battery packs to the at least one of the target voltage or the target energy level. The controller may be configured to calculate the time required to deplete the battery packs based on one or more operating conditions of the powered system. The one or more operating conditions of the powered system may change, and the controller may be configured to repeatedly calculate the time required to deplete the battery packs based on changes to the one or more operating conditions. The changes to the one or more operating conditions may include one or more of a change in auxiliary loads of the powered system, a change in tractive loads of the powered system, or a change in temperature of or around the powered system.

Optionally, the controller may be configured to send a notification indicating the time required to one or more of charge or deplete the battery packs to the at least one of the target voltage or the target energy level. The controller may be configured to identify one or more locations to add or remove one or more charging stations based on the time required to one or more of charge or deplete the battery packs that is calculated. The controller may be configured to communicate the time required to one or more of charge or deplete the battery packs to one or more of a movement planning system or a yard planning system. Optionally, the controller is onboard the powered system, and the powered system is a vehicle.

Optionally, the controller is configured to determine a health state of the battery packs, and to change the time that is calculated to charge the battery packs to the at least one of the target voltage or the target energy level, relative to the time that is initially calculated, based on the health state of the battery packs by controlling the charging power supplied to the battery packs by the one or more power sources.

Optionally, the powered system is one of plural powered systems. The controller may be configured to calculate the time required to charge the battery packs in each of the powered systems, and to predict an upcoming change in an operational state of the battery packs in at least one of the powered systems based on a comparison of the times required to charge the battery packs among the powered systems. The one or more power sources may include plural power sources, and the controller may be configured to calculate the time required to charge the battery packs in each of the powered systems. The controller may be configured to predict an upcoming change in an operational state of at least one of the power sources based on a comparison of the times required to charge the battery packs among the power sources.

In one embodiment, the controllers or systems described herein may have a local data collection system deployed and may use machine learning to enable derivation-based learning outcomes. The controllers may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used making determinations, calculations, comparisons and behavior analytics, and the like.

In one embodiment, the controllers may include a policy engine that may apply one or more policies. These policies may be based at least in part on characteristics of a given item of equipment or environment. With respect to control policies, a neural network can receive input of a number of environmental and task-related parameters. These parameters may include, for example, operational input regarding operating equipment, data from various sensors, location and/or position data, and the like. The neural network can be trained to generate an output based on these inputs, with the output representing an action or sequence of actions that the equipment or system should take to accomplish the goal of the operation. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   determining a charge capability of one or more power sources configured to supply charging power to multiple battery packs of a powered system;
   calculating a predicted charge time required to charge the battery packs to at least one of a target voltage or a target energy level, the predicted charge time being based at least in part on a current state of charge (SOC) of the battery packs, a pack configuration of the battery packs, and the charge capability;
   calculating an updated charge time required to charge the battery packs to the at least one of the target voltage or the target energy level, wherein the updated charge time is calculated while the powered system is receiving the charging power from the one or more power sources during a charging operation; and
   in response to determining that the updated charge time deviates from the predicted charge time by greater than a tolerance threshold, modifying the charging operation to reduce a deviation between the updated charge time and the predicted charge time.

2. The method of claim 1, wherein the predicted charge time is calculated based on a charge capability of the battery packs, the charge capability of the one or more power sources, and a charge capability of circuitry coupling the battery packs with the one or more power sources.

3. The method of claim 2, wherein the predicted charge time is also calculated based on a temperature of the battery packs.

4. The method of claim 1, wherein the updated charge time is calculated responsive to one or more of replacement of at least one of the battery packs or a change in a health state of at least one of the battery packs.

5. The method of claim 1, wherein the updated charge time is calculated responsive to a change in temperature of the battery packs.

6. The method of claim 1, wherein modifying the charging operation to reduce the deviation comprises controlling a thermal management system to change a temperature of the battery packs.

7. The method of claim 1, further comprising sending a notification indicating the predicted charge time.

8. The method of claim 1, further comprising identifying one or more locations to add or remove one or more charging stations based on the predicted charge time.

9. The method of claim 1, further comprising communicating the predicted charge time to one or more of a movement planning system or a yard planning system.

10. The method of claim 1, wherein the battery packs are arranged in multiple battery strings, and the predicted charge time is calculated based at least in part on a sequence or order in which the battery strings are connected with the one or more power sources.

11. The method of claim 10, further comprising connecting the battery strings to the one or more power sources in the sequence or order that is based at least in part on one or both of a fault status of a first battery pack of the battery strings or an imbalance in the SOCs of the battery strings.

12. The method of claim 1, wherein the powered system is one of plural powered systems, and further comprising:
    calculating a respective predicted charge time for each of the powered systems; and
    predicting an upcoming change in an operational state of the battery packs in at least one of the powered systems based on a comparison of the predicted charge times among the powered systems.

13. The method of claim 1, wherein the powered system is one of plural powered systems and the one or more power sources include plural power sources, and further comprising:
    calculating a respective charge time time required to charge battery packs in each of the powered systems; and
    predicting an upcoming change in an operational state of at least one of the power sources based on a comparison of the predicted charge times among the power sources.

14. The method of claim 1, wherein, responsive to determining that the updated charge time is greater than the predicted charge time, the charging operation is modified to increase a speed at which the battery packs reach the at least one of the target voltage or the target energy level.

15. The method of claim 1, wherein modifying the charging operation to reduce the deviation comprises one or more of changing a current or voltage of the charging power, changing a load drawn by an auxiliary device onboard the powered system, and/or controlling a thermal management system to change a temperature of the battery packs.

16. A charge transfer timing system comprising:
    a controller comprising one or more processors and configured to determine a charge capability of one or more power sources configured to supply charging power to multiple battery packs of a powered system,
    the controller configured to calculate a predicted charge time required to charge the battery packs to at least one of a target voltage or a target energy level, the controller configured to calculate the predicted charge time based at least in part on a current state of charge (SOC) of the battery packs, a pack configuration of the battery packs, and the charge capability of the one or more power sources,
    the controller configured to calculate an updated charge time required to charge the battery packs to the at least one of the target voltage or the target energy level, wherein the controller is configured to calculate the updated charge time while the powered system is receiving the charging power from the one or more power sources during a charging operation, in response to determining that the updated charge time deviates from the predicted charge time by greater than a tolerance threshold, the controller is configured to modify the charging operation to reduce a deviation between the updated charge time and the predicted charge time.

17. The charge transfer timing system of claim 16, wherein the controller is configured to calculate the predicted charge time based on a charge capability of the battery packs, the charge capability of the one or more power sources, a charge capability of circuitry coupling the battery packs with the one or more power sources, and a temperature of the battery packs.

18. The charge transfer timing system of claim 16, wherein the controller is configured to send a notification indicating the predicted charge time.

19. The charge transfer timing system of claim 16, wherein the controller is onboard the powered system, and the powered system is a vehicle.

20. The charge transfer timing system of claim 16, wherein the controller is configured to compare the updated charge time and the predicted charge time and determine that the updated charge time deviates from the predicted charge time by greater than the tolderance threshold.

* * * * *